US009304873B2

(12) United States Patent
McElhoe et al.

(10) Patent No.: US 9,304,873 B2
(45) Date of Patent: Apr. 5, 2016

(54) RECOVERY SYSTEM AND METHOD FOR RECREATING A STATE OF A DATACENTER

(75) Inventors: Glenn Bruce McElhoe, Arlington, MA (US); Hoki Tam, Quincy, MA (US); Dwayne Reeves, Cambridge, MA (US); Orran Krieger, Newton, MA (US); Philip McGachey, Stow, MA (US)

(73) Assignee: VMware, Inc., Palo Alto, CA (US)

( * ) Notice: Subject to any disclaimer, the term of this patent is extended or adjusted under 35 U.S.C. 154(b) by 236 days.

(21) Appl. No.: 13/593,060

(22) Filed: Aug. 23, 2012
(Under 37 CFR 1.47)

(65) Prior Publication Data
US 2014/0059375 A1 Feb. 27, 2014

(51) Int. Cl.
*G06F 9/455* (2006.01)
*G06F 11/14* (2006.01)
*G06F 11/20* (2006.01)

(52) U.S. Cl.
CPC ........ *G06F 11/1484* (2013.01); *G06F 9/45558* (2013.01); *G06F 11/2033* (2013.01); *G06F 2009/45562* (2013.01); *G06F 2009/45595* (2013.01)

(58) Field of Classification Search
CPC ................ H04L 12/4641; G06F 2009/45562; G06F 2009/45575; G06F 2009/45595; G06F 9/45558
USPC ....................... 714/4.11, 15, 16, 21
See application file for complete search history.

(56) References Cited

U.S. PATENT DOCUMENTS

| | | | |
|---|---|---|---|
| 8,135,985 B2 * | 3/2012 | Mishra et al. ................... 714/13 |
| 8,819,673 B1 * | 8/2014 | Wilkinson et al. ................ 718/1 |
| 9,124,633 B1 * | 9/2015 | Eizadi ..................... H04L 61/20 |
| 2007/0234337 A1 * | 10/2007 | Suzuki ...................... G06F 8/61 717/168 |
| 2009/0288084 A1 * | 11/2009 | Astete ................ G06F 9/45533 718/1 |
| 2009/0327471 A1 * | 12/2009 | Astete et al. .................. 709/223 |
| 2010/0235831 A1 * | 9/2010 | Dittmer ............................ 718/1 |
| 2011/0321041 A1 * | 12/2011 | Bhat et al. ......................... 718/1 |
| 2012/0159232 A1 * | 6/2012 | Shimada et al. .................. 714/3 |
| 2012/0167088 A1 * | 6/2012 | Sok .................................. 718/1 |
| 2013/0054932 A1 * | 2/2013 | Acharya .............. G06F 3/0605 711/202 |
| 2013/0091334 A1 * | 4/2013 | Yu et al. ........................ 711/162 |
| 2013/0246523 A1 * | 9/2013 | Gokhale ....................... 709/204 |
| 2013/0263122 A1 * | 10/2013 | Levijarvi et al. .................. 718/1 |

* cited by examiner

*Primary Examiner* — Joseph Schell
(74) *Attorney, Agent, or Firm* — Patterson & Sheridan LLP

(57) ABSTRACT

Embodiments include a recovery system, a computer-readable storage medium, and a method of recreating a state of a datacenter. The embodiments include a plurality of program modules that is executable by a processor to gather metadata from a first datacenter that includes at least one virtual machine (VM), wherein the metadata includes data representative of a virtual infrastructure of the first datacenter. The program modules are also executable by the processor to recreate a state of the first datacenter within a second datacenter using the metadata upon a determination that a failure occurred within the first datacenter, and to recreate the VM within the second datacenter.

20 Claims, 5 Drawing Sheets

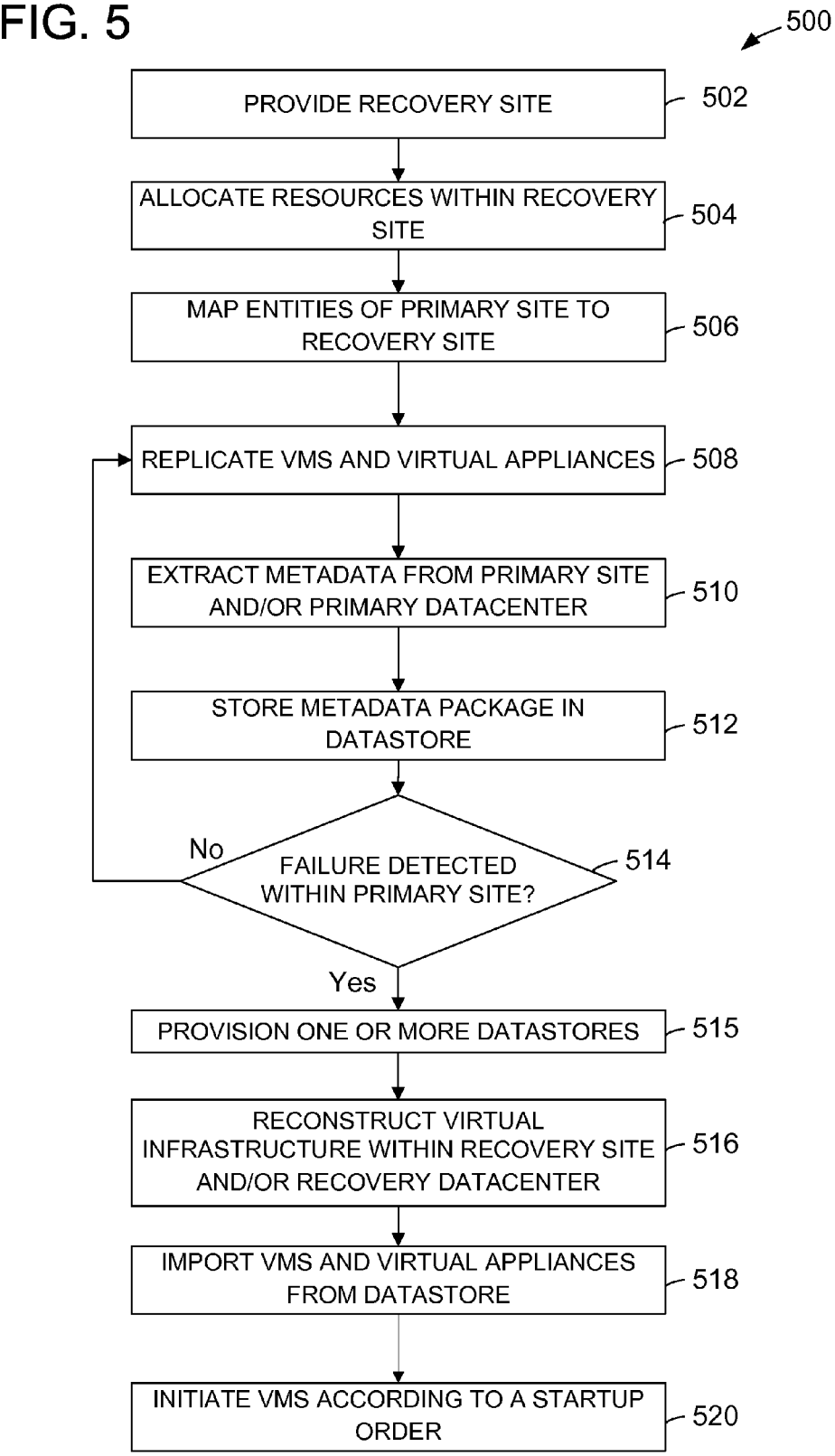

RECOVERY SYSTEM AND METHOD FOR RECREATING A STATE OF A DATACENTER

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

At least some host computing devices are grouped together in one or more datacenters within a common site. The datacenters may be at least partially virtualized so that computing devices and other resources may be abstracted and accessible to users as VMs. Virtualization of datacenters facilitates the migration and recovery of applications and data between computing devices and datacenters. For example, because the VMs are represented as one or more files, the VMs can be replicated onto remote storage and can be migrated to a backup site as desired.

However, at least some known datacenters may not provide complete recovery solutions for enterprise applications and/or for other components of the datacenter. Enterprise applications are often complex and may include many components residing on different VMs. Some VMs may have specific configurations required to execute them in a preferable manner. Moreover, some groups of VMs have a specific startup order, and initiating, or "powering on," the VMs in the wrong order can result in execution failure. If a failure occurs at a first, or primary datacenter and the VMs are recovered to a second, or recovery datacenter, the configuration settings for the VMs typically must be set up manually. In addition, components and configuration settings of the primary datacenter itself may not be stored in a recovery datacenter to enable the primary datacenter components and settings to be restored. For example, the primary datacenter may include one or more virtual datacenters instantiated therein and/or may include one or more virtual networks that may not be stored and recovered at the recovery datacenter.

SUMMARY

Embodiments described herein include a recovery system, a computer-readable storage medium, and a method of recreating a state of a datacenter. The embodiments include a plurality of program modules that is executable by a processor to gather metadata from a first datacenter that includes at least one virtual machine (VM). The metadata includes data representative of a virtual infrastructure of the first datacenter. The program modules are also executable by the processor to recreate a state of the first datacenter within a second datacenter, using the metadata, upon a determination that a failure occurred within the first datacenter, and to recreate the VM within the second datacenter.

BRIEF DESCRIPTION OF THE DRAWINGS

FIG. 5 is a flow diagram of an exemplary method of recreating a state of a datacenter that may be used with the recovery system shown in FIG. 4.

DETAILED DESCRIPTION

In one embodiment, a recovery system includes a primary datacenter, a recovery datacenter, and a plurality of datastores coupled to the primary datacenter and to the recovery datacenter. The primary datacenter is located within a primary site, and the recovery datacenter is located within a recovery site. The recovery system also includes a plurality of program modules, including a protection daemon, an extractor, a recovery agent, and a reconstructor. The recovery system facilitates protecting the primary datacenter such that the primary datacenter may be recovered or recreated within the recovery datacenter when a failure occurs within the primary datacenter and/or the primary site.

In operation, the recovery system extracts metadata from the primary datacenter and stores the metadata as a metadata package within a protection datastore. The metadata includes data representative of a virtual infrastructure of the primary datacenter, including a hierarchy of entities and/or components of the primary datacenter. The VMs within the primary datacenter are extracted to, or stored on, one or more protection datastores. The data of the protection datastores, including the metadata and VM data, is replicated to one or more recovery datastores coupled to the recovery datacenter. When a failure occurs within the primary site and/or the primary datacenter, the recovery system recreates the virtual infrastructure of the primary datacenter within the recovery datacenter. In addition, one or more networks from the primary datacenter are recreated within the recovery datacenter. Each VM is imported into, or recreated within, the recovery datacenter from the recovery datastores. Moreover, each VM is initiated, or "powered on," in a predetermined startup order based on the metadata stored in the recovery datastore.

Accordingly, as described herein, the recovery system automatically protects and recovers both the VMs of a datacenter and the virtual infrastructure of the datacenter. As the recovery system recovers the primary datacenter using the extracted metadata, VMs are imported into a virtual infrastructure, including the hierarchy of components and entities, that substantially mirrors the infrastructure of the primary datacenter. The networks are automatically restored as well, thus minimizing or reducing an amount of manual reconfiguration that may otherwise be required in prior art systems to prepare the recovery site for operation of the recovered datacenter.

As used herein, the term "state" refers to a configuration and/or a "snapshot" of data and/or other program information of a system or program at a point in time. In addition, as used herein, the terms "restore," "recreate," "recover," and "reconstruct" are used interchangeably.

Figure 1:
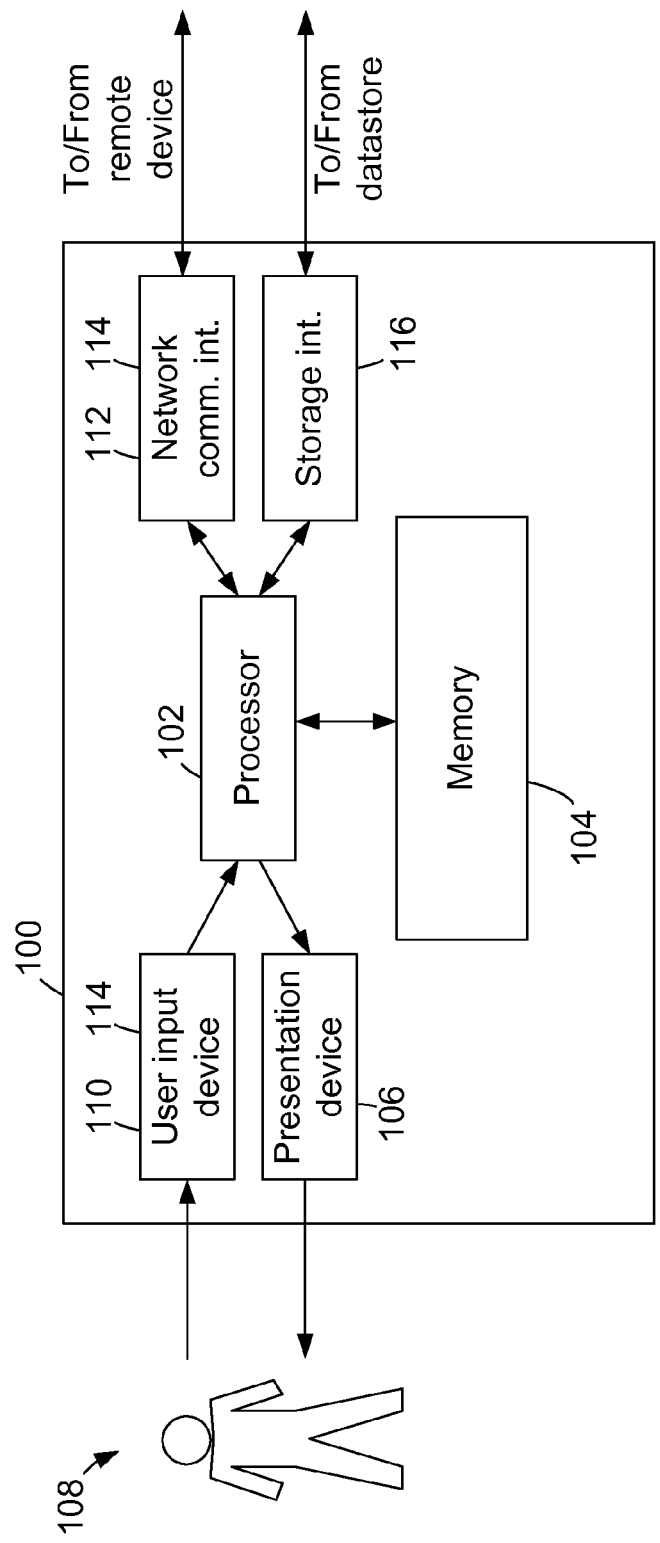
FIG. 1 is a block diagram of an exemplary computing device.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

In some embodiments, computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user. In some embodiments, presentation device 106 and/or user input device 110 are remote from computing device 100 and transmit and/or receive data via network communication interface 112.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
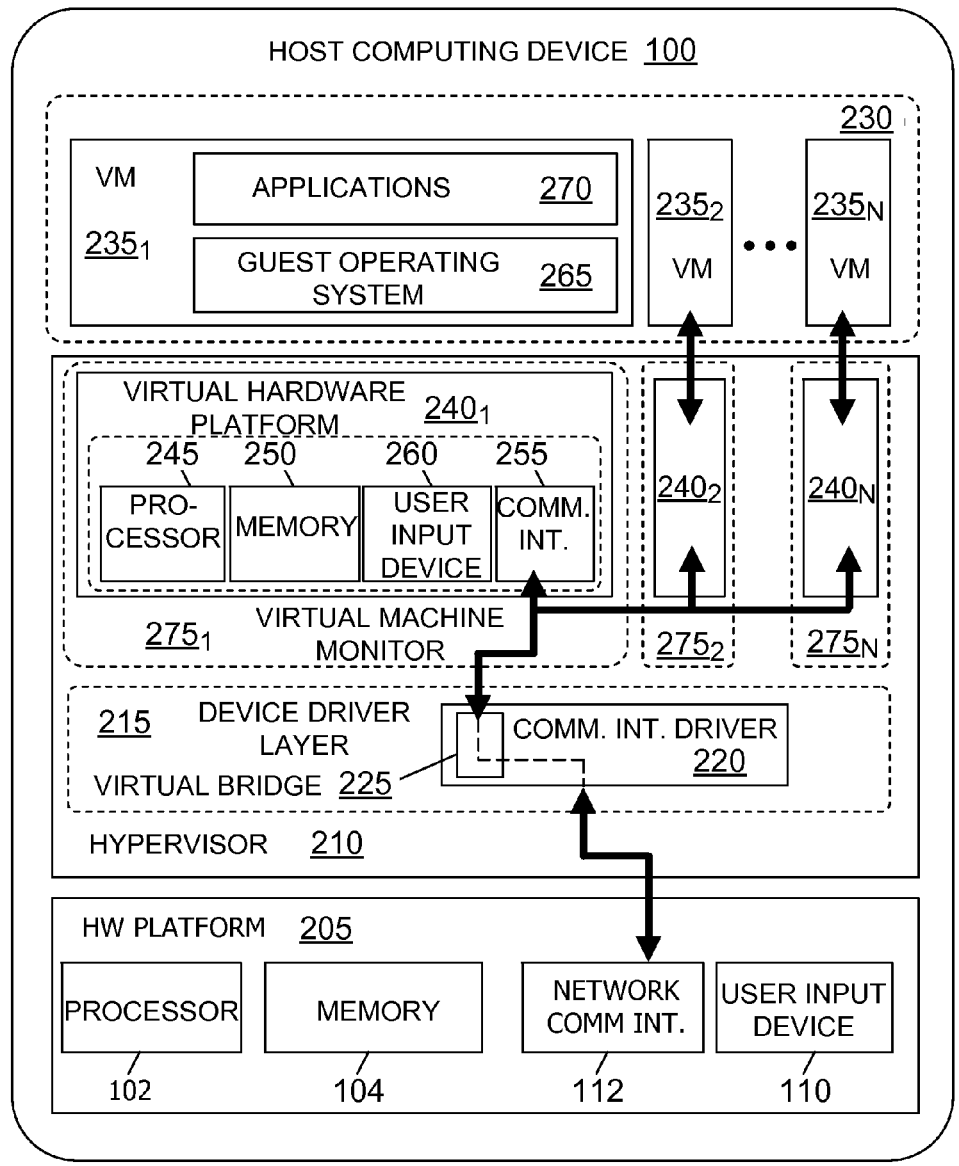
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$).

Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
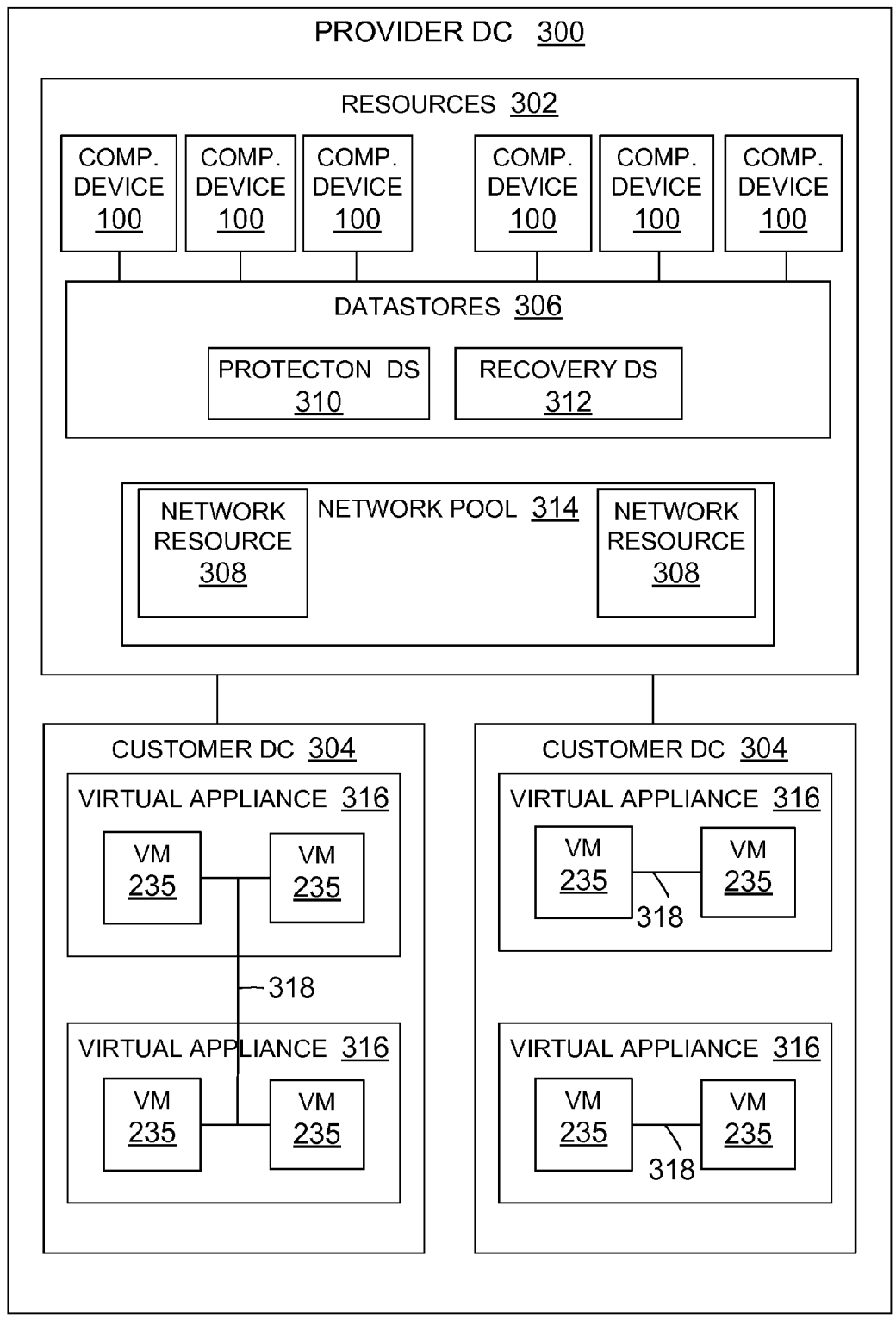
FIG. 3 is a block diagram of an exemplary datacenter associated with a plurality of computing devices, such as a plurality of computing devices shown in FIG. 1.

FIG. 3 is a block diagram of an exemplary datacenter 300 (hereinafter referred to as a provider datacenter 300) associated with a provider of a plurality of computing resources

302. Provider datacenter 300 and resources 302 may be located in a single building or site, such as a warehouse, an office complex, or any other building or site. Alternatively, provider datacenter 300 and/or resources 302 may be located in a plurality of sites that are interconnected with each other, for example, by one or more networks. In an embodiment, provider datacenter 300 is a virtual datacenter that provides physical and/or virtual computing resources 302.

In an embodiment, provider datacenter 300 includes a plurality of datacenters 304 allocated to one or more customers (hereinafter referred to as "customer datacenters 304"). More specifically, customer datacenters 304 are virtual datacenters to which resources 302 are assigned or allocated by provider datacenter 300. Alternatively, one or more customer datacenters 304 may include a plurality of computing devices 100 allocated from resources 302. In addition, each customer datacenter 304 includes at least one VM 235.

In an embodiment, resources 302 include a plurality of host computing devices 100, a plurality of datastores 306 coupled to host computing devices 100, and a plurality of network resources 308. It should be recognized that any number of computing devices 100, network resources 308, and datastores 306 may be included within provider datacenter 300 to enable datacenter 300 to function as described herein.

Datastores 306 include one or more protection datastores 310 and/or one or more recovery datastores 312. As described more fully herein, protection datastores 310 and recovery datastores 312 are used to store data for use in recovering provider datacenter 300, or portions thereof. In an embodiment, each VM 235 is stored on a single protection datastore 310 of a first provider datacenter 300 to be protected (also known as a primary datacenter) and is replicated to a single recovery datastore 312 of a second provider datacenter 300 (also known as a recovery datacenter) to facilitate ensuring that data accesses to and from each VM 235 are maintained in a proper order in an event that VM 235 needs to be restored.

Network resources 308 may include, for example, network switches, routers, repeaters, and/or any other network device that enables computing devices 100, datastores 306, and/or other components of provider datacenter 300 to communicate together. Network resources 308 may be logically organized in a network pool 314.

Each customer datacenter 304 includes one or more virtual appliances 316, and each virtual appliance 316 includes one or more VMs 235. Virtual appliances 316 are preconfigured software solutions installed on a virtualization layer, such as a hypervisor. In an embodiment, each virtual appliance 316 is packaged, updated, maintained, and/or managed as a unit to facilitate efficient distribution and installation of virtual appliances 316 and/or VMs 235.

VMs 235 within each virtual appliance 316 may be coupled to other VMs 235 within virtual appliance 316 and/or to any other VM 235 by one or more networks 318. In an embodiment, each network 318 is allocated from network pool 314 by provider datacenter 300 and/or by customer datacenter 304.

Figure 4:
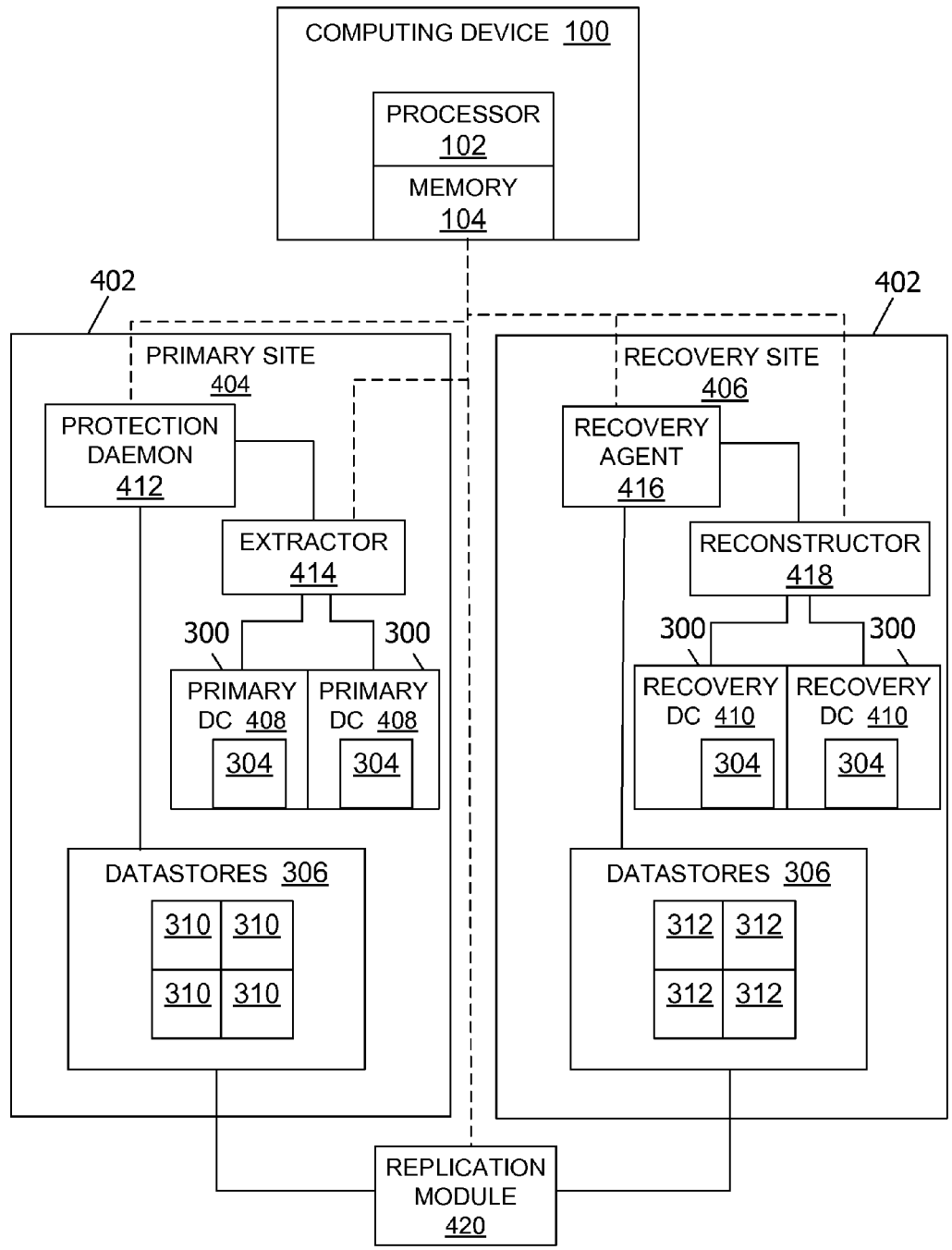
FIG. 4 is a block diagram of an exemplary recovery system that may be used with the datacenter shown in FIG. 3.

FIG. 4 is a block diagram of an exemplary recovery system 400 that includes a plurality of sites 402. In an embodiment, sites 402 include a primary site 404 and a recovery site 406. Primary site 404 includes at least one provider datacenter 300 (referred to herein as a "primary datacenter 408"), and recovery site 406 includes at least one provider datacenter 300 (referred to herein as a "recovery datacenter 410"). In an embodiment, each site 402 is, or includes, one or more buildings or locations in which computing devices are stored. Sites 402 are sometimes referred to as cloud provider sites or datacenter provider sites.

Recovery system 400 includes a protection daemon 412 and an extractor 414 coupled to protection daemon 412. In an embodiment, protection daemon 412 and/or extractor 414 are positioned remotely from primary site 404 and are coupled to primary site 404 and to primary datacenter 408 by one or more networks. Primary site 404 includes a plurality of resources associated with, or allocated to, primary datacenter 408, including one or more protection datastores 310. Primary datacenter 408 includes one or more customer datacenters 304. In an embodiment, primary site 404 and/or primary datacenter 408 is used for normal operation of customer datacenters 304.

In an embodiment, a plurality of primary datacenters 408 are included within primary site 404. An administrator or an owner of primary site 404 may designate primary datacenters 408 as protected datacenters or as unprotected datacenters. Protected datacenters are primary datacenters 408 that are protected by recovery system 400 such that datacenters 408 are restored within recovery site 406 if primary site 404 and/or primary datacenter 408 fails. Unprotected datacenters are datacenters that are not protected by recovery system 400 such that no recovery is performed if primary site 404 and/or primary datacenter 408 fails. An owner of primary site 404 may charge a higher cost for datacenters that are protected as compared to a cost for datacenters that are unprotected. Unless otherwise specified, primary datacenters 408 described herein are protected datacenters.

Recovery system 400 also includes a recovery agent 416, and a reconstructor 418 coupled to recovery agent 416. In an embodiment, recovery agent 416 and/or reconstructor 418 are positioned remotely from recovery site 406 and are coupled to recovery site 406 and to recovery datacenter 410 by one or more networks. Recovery site 406 also includes a plurality of resources associated with, or allocated to, recovery datacenter 410, including one or more recovery datastores 312. In an embodiment, recovery site 406 is used to recover a state of primary datacenter 408 if primary site 404 and/or primary datacenter 408 fails, for example.

Recovery system 400 also includes a replication module 420 communicatively coupled to datastores 306 (e.g., protection datastores 310) of primary datacenter 408 and to datastores 306 (e.g., recovery datastores 312) of recovery datacenter 410. In an embodiment, replication module 420 is a program module that is executable by a processor to replicate data, including VMs 235, from primary datacenter 408 to recovery datacenter 410 at predetermined intervals, as described more fully herein.

In an embodiment, one or more program modules, such as protection daemon 412, extractor 414, recovery agent 416, reconstructor 418, and/or replication module 420, are stored within a computer-readable storage medium, such as memory 104, of a computing device 100. The computing device 100, and processor 102 of computing device 100, is communicatively coupled to primary site 404, primary datacenter 408, recovery site 406, and/or recovery datacenter 410. Alternatively, computing device 100 may be positioned within primary site 404, primary datacenter 408, recovery site 406, or recovery datacenter 410. In addition, one or more of the program modules are executable by a processor 102 of computing device 100 to perform the functions described herein. In one embodiment, protection daemon 412, extractor 414, recovery agent 416, reconstructor 418, and replication module 420 may be combined into a single program module, or a plurality of program modules, to perform the functions described herein.

In an embodiment, extractor 414 is a program module that is executed by a processor to gather metadata and/or other data from primary site 404 and/or primary datacenter 408. As used herein, gathering data or metadata from primary site 404 and/or from primary datacenter 408 includes gathering data or metadata from resources within primary site 404 and/or primary datacenter 408, such as computing devices, datastores, and/or network resources. Protection daemon 412 is a program module, executable by a processor, that invokes, or "calls," extractor 414 to cause extractor 414 to gather the metadata and/or other data from primary site 404 and/or primary datacenter 408. Protection daemon 412 stores the metadata and/or other data received from extractor 414 in protection datastore 310. In one embodiment, the metadata is stored in a separate protection datastore 310 (sometimes referred to as a "bootstrap datastore") than the protection datastores 310 used to store data for each VM 235.

Metadata gathered by extractor 414 includes data representative of a framework or virtual infrastructure needed to rebuild primary site 404 and/or primary datacenter 408 in recovery site 406 and/or recovery datacenter 410. As used herein, the term "virtual infrastructure" refers to one or more software components and/or configuration settings that facilitate constructing and/or operating a datacenter. For example, the virtual infrastructure may include software components and/or configuration settings that provide centralized management, resource allocation and optimization, instantiation of virtual datacenters within the datacenter, instantiation and/or encapsulation of virtual networks defined within the datacenter, and/or any other components and/or configuration settings that enable the datacenter to function.

Such metadata may include, for example, data regarding resources of primary datacenter 408 (e.g., the storage capacity of primary datacenter 408, the computing capacity of primary datacenter 408, and/or the number, identity, and/or capacity of datastores 306 associated with primary datacenter 408), data regarding resources allocated to each customer datacenter 304, a list of virtual appliances 316 and/or VMs 235 within each customer datacenter 304, configuration settings of VMs 235 within each customer datacenter 304 (including a startup order of VMs 235 for each customer datacenter 304), configuration settings for each network within primary site 404, primary datacenter 408, and/or customer datacenters 304, and/or an identity and/or a connection identifier of each resource, customer datacenter 304, and/or other component of primary datacenter 408 and/or primary site 404. The connection identifier may include a uniform resource locator (URL) and/or any other identifier that enables recovery system 400 to function as described herein. The metadata may also include, for example, a hierarchy of datacenters, resources, and/or other components of primary datacenter 408 and/or primary site 404.

Extractor 414 organizes the metadata into a metadata package and transmits the metadata package to protection daemon 412. In an embodiment, protection daemon 412 stores the metadata package in protection datastore 310 in a format that is readable by recovery agent 416 and/or reconstructor 418, such as in an extensible markup language (XML) format. Data stored in protection datastores 310, including the metadata package and data representative of VMs 235, is replicated, or transmitted, to one or more recovery datastores 312 in, or coupled to, recovery site 406 by replication module 420.

Reconstructor 418 and recovery agent 416 are program modules that are executable by a processor. In an embodiment, reconstructor 418 is invoked or called by recovery agent 416. Recovery agent 416 extracts the metadata from the metadata package stored in recovery datastore 312, and transmits the metadata to reconstructor 418. Reconstructor 418 rebuilds or recreates primary datacenter 408 and/or primary site 404 within recovery site 406. More specifically, reconstructor 418 creates the framework or virtual infrastructure of primary site 404 and primary datacenter 408 within recovery site 406 using the metadata stored in recovery datastore 312. Reconstructor 418 then rebuilds or recreates virtual appliances 316, VMs 235, and other data stored within recovery datastores 312 into the framework created from the metadata.

During operation, recovery system 400 implements a setup phase, a protection phase, and a recovery phase. During the setup phase, recovery system 400 is configured and prepared to enable primary datacenter 408 and/or primary site 404 to be recovered if a failure occurs. More specifically, in an embodiment, a network connection is established between datastores 306 of primary datacenter 408 and datastores 306 of recovery datacenter 410. For example, protection datastores 310 of primary datacenter 408 are connected to recovery datastores 312 of recovery datacenter 410 by replication module 420 to facilitate replicating the data from datastores 306 of primary datacenter 408 (e.g., protection datastores 310) to datastores 306 of recovery datacenter 410 (e.g., recovery datastores 312).

Moreover, resources are allocated or reserved within recovery datacenter 410 in an amount that is expected to be needed to replicate primary datacenter 408 if a failure of primary datacenter 408 and/or primary site 404 occurs. It should be recognized that the allocated resources may be used for other purposes until primary datacenter 408 needs to be recreated in recovery datacenter 410.

A portion of the framework or virtual infrastructure of primary datacenter 408 is "mapped" onto, or created within, recovery datacenter 410. In an embodiment, a unique identifier, such as a unique name, is associated with each datastore 306 and each customer datacenter 304 within primary datacenter 408 and is mapped from primary datacenter 408 to recovery datacenter 410. In one embodiment, the identifier for each datastore 306 and/or for each customer datacenter 304 is prefixed with a name or another identifier of primary site 404 to ensure that the identifiers are not duplicated by other components within recovery datacenter 410. Recovery system 400 stores the identifier mappings in memory, such as within protection datastores 310 and/or recovery datastores 312.

Accordingly, a placeholder is created within recovery datacenter 410 for each datastore 306 and each customer datacenter 304 of primary datacenter 408. It should be recognized that not every component within primary datacenter 408 may be mapped onto recovery datacenter 410 during the setup phase. For example, networks associated with primary datacenter 408 may not be mapped to recovery datacenter 410. Rather, networks may be created or allocated by reconstructor 418 from a network pool 314 within recovery datacenter 410 and/or recovery site 406 during the recovery phase (i.e., during a time period when primary datacenter 408 is replicated within recovery datacenter 410).

During the protection phase, data and metadata from primary datacenter 408 and/or primary site 404 is gathered at predetermined intervals. The intervals are selected based on selected recovery point objectives (RPO) and/or based on a determination of an acceptable amount of data loss in an event of a failure of primary site 404 and/or primary datacenter 408. For example, a user or an administrator may input into protection daemon 412 a desired frequency at which protection daemon 412 and extractor 414 gather the data and the metadata.

Protection daemon 412 is a continuously or periodically executing process that manages the protection of primary site 404. Protection daemon 412 maintains a list of protected primary datacenters 408. Protection daemon 412 invokes extractor 414 at the predetermined intervals to query primary site 404 and/or primary datacenter 408 to extract the metadata needed to reconstruct primary site 404 and/or primary datacenter 408 at recovery site 406. In an embodiment, extractor 414 is a library that does not store login credentials, for example, that may be required to access data at primary site 404. Accordingly, protection daemon 412 stores the login credentials and transmits the login credentials to extractor 414 each time extractor 414 is executed. In addition, protection daemon 412 passes the list of protected primary datacenters 408 to extractor 414.

In an embodiment, extractor 414 uses an application programming interface (API) to communicate with primary site 404 and/or primary datacenter 408. Extractor 414 gathers metadata from each protected primary datacenter 408 and/or from primary site 404, and stores the metadata for each primary datacenter 408 as a metadata package in protection datastore 310 associated with primary datacenter 408. In an embodiment, extractor 414 uses a series of recursive hypertext transport protocol (HTTP) GET requests to gather the metadata from primary datacenter 408 and from other components of primary site 404 and/or primary datacenter 408. Alternatively, any suitable protocol or method may be used to gather the metadata from primary datacenter 408 and/or primary site 404. It should be recognized that each HTTP GET request received by a component within primary site 404 returns configuration information for the component in addition to a uniform resource locator (URL) of any entities within it. Therefore, a recursive series of HTTP GET requests that traverse a hierarchy of primary site 404 provide substantially all the information needed from primary site 404 and/or primary datacenter 408. In an embodiment, at least some other data, such as network configuration data for the networks associated with primary site 404 and/or primary datacenter 408, is not part of the hierarchy and is obtained separately from the recursive requests.

In an embodiment, extractor 414 receives a list of customer datacenters 304 within primary datacenter 408 in response to the HTTP GET request. The list of customer datacenters 304 includes a resource identifier, such as a uniform resource locator (URL) for each datacenter 304. In an embodiment, extractor 414 transmits another HTTP GET request to each customer datacenter 304 within primary datacenter 408 using the URL of customer datacenter 304. Configuration information specific to each customer datacenter 304 is received by extractor 414 in response to the HTTP GET request. The configuration information includes information needed to recreate customer datacenter 304 within recovery datacenter 410, including computing and storage capacity allocated to customer datacenter 304, quotas regarding a number of VMs and networks within customer datacenter 304, and/or any other suitable data. In addition, a list of virtual appliances is provided.

Extractor 414 issues another HTTP GET request to the virtual appliances within customer datacenter 304. Each virtual appliance provides a list of VMs instantiated within the virtual appliance, network configurations used with the virtual appliance, the configurations of each virtual appliance, a startup order of the VMs and/or of the virtual appliance, and/or any other suitable data that enables extractor 414 to function as described herein. Extractor 414 also issues an HTTP GET request to each VM within each virtual appliance to gather the configuration data needed to replicate the VM within recovery datacenter 410.

Extractor 414 organizes the extracted information from each primary datacenter 408 into a metadata package associated with primary datacenter 408. Extractor 414 transmits the metadata package to protection daemon 412, and protection daemon 412 stores the metadata package in protection datastore 310 that is associated with primary datacenter 408.

In an embodiment, the networks used by customer datacenters 304 may not be confined to customer datacenters 304 and/or primary datacenters 408. Rather, such networks may cross datacenter boundaries to communicatively couple a plurality of customer datacenters 304 and/or primary datacenters 408 together. Accordingly, to ensure that a network is properly restored to all associated customer datacenters 304 and/or primary datacenters 408, extractor 414 stores configuration data for each network within protection datastore 310 of each primary datacenter 408. While each metadata package may therefore include potentially duplicative network configuration data, such duplications are resolved at the recovery phase in which reconstructor 418 only restores the networks of a metadata package that have not been already restored from other metadata packages.

It should be recognized that the protection phase is executed repeatedly and/or periodically until primary site 404 fails. For example, primary site 404 may fail if site 404 loses power, if one or more cooling systems fail within site 404, if computing devices 100 within site 404 experience failures, and/or if any other event occurs that prevents primary site 404 and/or datacenters 300 from operating normally.

In addition to storing metadata at predetermined intervals, recovery system 400 also stores or replicates VMs 235 of customer datacenters 304 and/or VMs 235 of primary datacenter 408 within recovery datastores 312 of recovery datacenter 410. In an embodiment, VMs 235 are replicated using array-based replication wherein controllers of each protection datastore 310 associated with primary datacenter 408 cause the data stored within protection datastore 310 to be replicated to a datastore 306 (i.e., a recovery datastore 312) of recovery datacenter 410. Accordingly, each datastore 306 and each VM 235 associated with a protected primary datacenter 408 within primary site 404 is replicated to recovery site 406 and/or recovery datacenter 410 at a predetermined interval. In an embodiment, VMs 235 and protection datastores 310 may be replicated at a predetermined interval that is different than the predetermined interval at which the metadata is gathered. For example, VMs 235 and protection datastores 310 may be replicated less frequently than the metadata is gathered because a cost of the data replication may be higher than the cost of gathering the metadata.

In an embodiment, the recovery phase is initiated when primary site 404 experiences a failure and when recovery site 406 is directed to restore primary site 404 and/or one or more primary datacenters 408. During the recovery phase, an owner or operator of primary site 404 transmits a list of primary datacenters 408 to be restored and a list of recovery datastores 312 within recovery site 406 associated with primary datacenters 408. Alternatively, recovery site 406 may receive the list of primary datacenters 408 and a list of the associated recovery datastores 312 from a file or another resource located within recovery site 406 and/or coupled to recovery site 406. Recovery agent 416 is invoked and the list of primary datacenters 408 to be restored, as well as the associated recovery datastores 312, is input into recovery agent 416 or is transmitted to recovery agent 416.

Recovery agent 416 extracts or retrieves the metadata package from each recovery datastore 312. In an embodiment, the metadata packages provide information about datastores 306 that were in use by primary datacenter 408 before the failure occurred. Accordingly, recovery agent 416 connects recovery datacenter 410 to datastores 306 identified in the metadata package. Recovery agent 416 invokes reconstructor 418 for each protected primary datacenter 408 (i.e., each primary datacenter 408 identified in the list of datacenters provided to recovery agent 416). Recovery agent 416 provides reconstructor 418 with the metadata package for each primary datacenter 408, a reference to a new empty primary datacenter (i.e., a recovery datacenter 410 reserved during the setup phase), and a reference to recovery datastore 312 corresponding to primary datacenter 408 to be recovered. Recovery agent 416 also passes to reconstructor 418 any necessary mappings between old and new entity references. In addition, reconstructor 418 imports VMs 235 from recovery datastores 312 for use recreating VMs 235 within recovery datacenter 410 during the recovery process.

Reconstructor 418 recreates the virtual infrastructure of primary site 404 and/or primary datacenter 408 within recovery site 406. For example, reconstructor 418 recreates networks of primary datacenter 408 within recovery datacenter 410 using the network configuration settings stored in the metadata package within recovery datastore 312. In an embodiment, reconstructor 418 recreates the virtual infrastructure of primary site 404 and/or primary datacenter 408, including networks, before primary datacenter 408 is reconstructed within recovery datacenter 410.

As network configuration settings for each network are stored within each metadata package, reconstructor 418 determines whether each network has already been restored during the reconstruction of another primary datacenter 408, for example. If the network has not already been restored, reconstructor 418 allocates the network from a network pool of recovery datacenter 410. Because network pools within primary datacenter 408 and recovery datacenter 410 are abstracted and are substantially similar, networks can be created out of any available network pool within recovery datacenter 410. In an embodiment, networks that are created use the same name that networks from primary datacenter 408 use to simplify recovery, since network names only should be unique within the scope of customer datacenter 304.

Reconstructor 418 reconstructs primary datacenter 408 within recovery datacenter 410 using, for example, HTTP requests such as HTTP PUT and HTTP POST requests. The HTTP PUT request causes recovery datacenter 410 to incorporate the configuration settings of primary datacenter 408 included within the metadata. More specifically, the empty recovery datacenter 410 is reconfigured by executing an HTTP PUT request to the URL of recovery datacenter 410. Reconstructor allocates customer datacenters 304 within recovery datacenter 410 by transmitting a HTTP POST request to a datacenter creation URL included within recovery datacenter 410. In the body of the request, reconstructor 418 specifies the configuration data and the identity of customer datacenters 304 that reconstructor 418 retrieves from the metadata. Accordingly, reconstructor 418 creates an empty customer datacenter that is configured to match customer datacenter 304 of primary datacenter 408. While reconstructor 418 is described as using HTTP requests, it should be recognized that reconstructor 418 may use any suitable protocol or method that enables recovery system 400 to function as described herein.

Reconstructor 418 imports each VM 235 into recovery datacenter 410 (or recreates VMs 235 within recovery datacenter 410), and into customer datacenters 304 of recovery datacenter 410, by issuing an HTTP POST request to an import action URL of recovery datacenter 410. The import action creates a virtual appliance 316 and imports the specified VMs 235 into the newly created virtual appliance 316. After VMs 235 have been imported or recreated, reconstructor 418 reconfigures virtual appliance 316 and VMs 235 using the metadata from primary site 404. More specifically, reconstructor 418 configures virtual appliance 316 and VMs 235 to use the allocated networks. In addition, reconstructor 418 may provide an internet protocol (IP) address to VMs 235 if VMs 235 are configured for static IP addressing, for example. In an embodiment, the IP address may be the same IP address used within primary datacenter 408.

In an embodiment, reconstructor 418 receives a sequence or order in which VMs 235 are to be initiated, or "powered on," from the metadata package. Reconstructor 418 initiates VMs 235 in the sequence received from the metadata to complete the recovery phase of recovery system 400. At this point, the state of primary datacenter 408 and/or primary site 404 has been reconstructed or recovered within recovery site 406.

FIG. 5 is a flow diagram of an exemplary method 500 for recreating a state of a datacenter, such as a primary datacenter. In an embodiment, method 500 is embodied within a plurality of computer-executable instructions stored in a memory, such as a computer-readable storage medium. The instructions are executed by a processor to perform the functions described herein.

In an embodiment, a recovery site is provided 502 for a primary site that is to be protected by method 500. The primary site includes at least one primary datacenter that includes at least one customer datacenter. The customer datacenter includes at least one virtual appliance, and each virtual appliance includes at least one VM. A plurality of resources, such as computing, storage, and network resources, are allocated 504 within the recovery site to ensure that the resources are available to recover the primary site and/or the primary datacenter within the primary site if a failure occurs within the primary site and/or the primary datacenter.

A plurality of entities within the primary site are mapped 506 to the recovery site. For example, placeholders for the primary datacenters and/or the customer datacenters of the primary site are created within the recovery site. A recovery agent and/or a reconstructor program module of the recovery system maintains a list of the mappings between a name and/or another identifier of the primary datacenters and/or the customer datacenters of the primary site, and a location within the recovery site and/or the recovery datacenter that will be used to reconstruct the primary datacenters and/or the customer datacenters of the primary site.

In an embodiment, a state of the VMs and virtual appliances of the primary site and/or the primary datacenter are replicated 508 periodically or upon the occurrence of an event. The VM and the virtual appliance states are stored within one or more protection datastores of the primary site, and are replicated to one or more recovery datastores coupled to the recovery datacenter and/or the recovery site. More specifically, the datastores of the primary datacenter and/or the primary site, including VM files and VM disk files, are replicated to one or more recovery datastores coupled to the recovery datacenter and/or the recovery site. In addition, metadata is extracted 510 from the primary site and/or from the primary datacenter periodically or upon the occurrence of an event. It should be recognized that the states of the VMs and the virtual appliances may be stored at a different interval or upon the occurrence of a different event than that of the metadata extraction. The extracted metadata is stored 512 as a metadata package in a protection datastore of the primary datacenter and is replicated, or transmitted, to a recovery datastore that is coupled to the recovery site and/or to the recovery datacenter.

The replication 508 of the VMs and the virtual appliances, the extraction 510 of the metadata, and the storage 512 of the metadata package are repeated until a failure is detected 514 within the primary site or within the primary datacenter. If a failure is detected 514 within the primary site or within the primary datacenter, one or more recovery datastores are provisioned 515 at the recovery site and/or the recovery datacenter. The provisioning of the recovery datastores ensures that the replicated data (i.e., the data within the recovery datastores) is transformed and/or is available in a suitable format to be used by the recovery site and/or the recovery datacenter as a recovery datastore. The virtual infrastructure of the primary site and/or of the primary datacenter is reconstructed 516, for example, by a recovery agent and a reconstructor program module. The VMs and the virtual appliances that were stored in the recovery datastore (i.e., that were replicated 508 above) are imported 518 into the recovery site and/or into the recovery datacenter.

In addition, at least some VMs may need to be initiated in a particular startup order or sequence. Accordingly, the startup order of the VMs may be determined from configuration data stored within the metadata package. When the startup order of the VMs is determined, each VM is initiated 520 according to the startup order.

Exemplary Operating Environment

The recovery system as described herein may be performed by one or more computers or computing devices. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A recovery system comprising:
a first datacenter comprising a plurality of virtual machines (VMs);
a second datacenter;
at least one processor coupled to the first datacenter and to the second datacenter; and
a plurality of program modules that is executable by the at least one processor to:
gather metadata from the first datacenter, wherein the metadata includes data representative of a virtual infrastructure of the first datacenter, the virtual infrastructure including software components and configuration settings that facilitate constructing and operating the first datacenter;
store the gathered metadata together with files associated with the VMs in a first datastore coupled to the first datacenter;
replicate the first datastore to a second datastore coupled to the second datacenter, thereby replicating the gathered metadata along with the files associated with the VMs; and
recreate a state of the first datacenter within the second datacenter using the replicated metadata and the replicated files associated with the VMs, upon a determination that a failure occurred within the first datacenter.

2. The recovery system of claim 1, wherein the plurality of program modules comprises an extractor that gathers the metadata and organizes the metadata into a metadata package.

3. The recovery system of claim 2, wherein the plurality of program modules comprises a protection daemon that receives the metadata package and stores the metadata package in the first datastore.

4. The recovery system of claim 3, wherein the recovery system further comprises a replication module that replicates the metadata package from the first datastore to the second datastore.

5. The recovery system of claim 4, wherein the plurality of program modules further comprises a recovery agent that extracts the metadata from the metadata package replicated within the second datastore.

6. The recovery system of claim 5, wherein the plurality of program modules further comprises a reconstructor that receives the metadata from the recovery agent and recreates a state of the first datacenter within the second datacenter.

7. The recovery system of claim 1, wherein the first datacenter comprises at least one network, the plurality of program modules is executable by the at least one processor to gather network configuration data for the at least one network and store the network configuration data in the first datastore.

8. The recovery system of claim 1, wherein the gathered and replicated metadata includes data indicating an order for initiating the plurality of VMs, and wherein, upon the determination that the failure occurred within the first datacenter, the plurality of VMs are initiated within the second datacenter according to the order for initiating the plurality of VMs indicated by the metadata.

9. A non-transitory computer-readable storage medium having computer-executable instructions embodied thereon, wherein, when executed by at least one processor, the computer-executable instructions cause the at least one processor to:
gather metadata from a first datacenter that includes a plurality of virtual machines (VMs), wherein the metadata includes data representative of a virtual infrastructure of the first datacenter, the virtual infrastructure including software components and configuration settings that facilitate constructing and operating the first datacenter;
store the gathered metadata together with files associated with the VMs in a first datastore coupled to the first datacenter;
replicate the first datastore to a second datastore coupled to a second datacenter, thereby replicating the gathered metadata along with the files associated with the VMs; and
recreate a state of the first datacenter within the second datacenter using the replicated files associated with the VMs and the replicated metadata upon a determination that a failure occurred within the first datacenter.

10. The computer-readable storage medium of claim 9, wherein the computer-executable instructions further cause the at least one processor to recreate the plurality of VMs within the second datacenter upon the determination that a failure occurred within the first datacenter.

11. The computer-readable storage medium of claim 9, wherein the computer-executable instructions further cause the at least one processor to gather metadata that further includes a list of components of the first datacenter.

12. The computer-readable storage medium of claim 9, wherein the computer-executable instructions further cause the at least one processor to package the metadata into a metadata package and store the metadata package in the first datastore coupled to the first datacenter.

13. The computer-readable storage medium of claim 12, wherein the computer-executable instructions further cause the at least one processor to transmit the metadata package to the second datastore coupled to the second datacenter.

14. The computer-readable storage medium of claim 9, wherein the first datacenter includes at least one network, and wherein the computer-executable instructions further cause the at least one processor to gather network configuration data for the at least one network and store the network configuration data in the first datastore.

15. A method of recreating a state of a datacenter, said method comprising:
gathering, by a processor, metadata from a first datacenter that includes a plurality of virtual machines (VMs) and at least one network, wherein the metadata includes network configuration data for the at least one network, the virtual infrastructure including software components and configuration settings that facilitate constructing and operating the first datacenter;
storing the gathered metadata together with files associated with the VMs within a first datastore coupled to the first datacenter;
replicating the first datastore to a second datastore coupled to a second datacenter, thereby replicating the gathered metadata along with the files associated with the VMs; and
recreating, by a processor, a state of the first datacenter within the second datacenter using the replicated metadata and the replicated files associated with the VMs upon a determination that a failure occurred within the first datacenter.

16. The method of claim 15, further comprising recreating the plurality of VMs within the second datacenter upon the determination that a failure occurred within the first datacenter.

17. The method of claim 15, further comprising packaging the metadata into a metadata package by a first program module and storing the metadata package in the first datastore, wherein the metadata package is replicated to the second datastore.

18. The method of claim 17, further comprising extracting, by a second program module, the metadata from the metadata package within the second datastore when a failure of the first datacenter is determined to have occurred.

19. The method of claim 15, wherein the first datacenter includes a third datacenter, said method further comprising storing a state of the third datacenter within the first datastore.

20. The method of claim 19, further comprising recreating the state of the first datacenter and the state of the third datacenter upon the determination that a failure occurred within the first datacenter.

* * * * *